United States Patent [19]

Ehrlich et al.

[11] 4,379,904

[45] Apr. 12, 1983

[54] NOVEL POLYURETHANE PRODUCT

[75] Inventors: Benjamin S. Ehrlich, Cheshire; Richard W. Oertel, III, Guilford, both of Conn.

[73] Assignee: The Upjohn Company, Kalamazoo, Mich.

[21] Appl. No.: 371,534

[22] Filed: Apr. 26, 1982

Related U.S. Application Data

[63] Continuation-in-part of Ser. No. 348,324, Feb. 12, 1982, abandoned, which is a continuation of Ser. No. 209,862, Nov. 24, 1980, abandoned.

[51] Int. Cl.³ ............................................. C08G 18/48
[52] U.S. Cl. ........................................ 528/65; 528/76; 528/77; 528/80; 528/83
[58] Field of Search ............... 528/65, 77, 76, 80, 528/83

[56] References Cited

U.S. PATENT DOCUMENTS

| | | | |
|---|---|---|---|
| 2,871,218 | 1/1959 | Schollenberger | 528/83 |
| 3,015,650 | 1/1962 | Schollenberger | 528/84 |
| 3,493,634 | 2/1970 | Kolycheck | 528/80 |
| 3,798,200 | 3/1974 | Kaneko et al. | 528/65 |
| 3,963,681 | 6/1976 | Kaneko et al. | 528/61 |
| 4,010,146 | 3/1977 | Russell et al. | 528/77 |
| 4,049,636 | 9/1977 | Mao et al. | 528/53 |
| 4,124,572 | 11/1978 | Mao | 528/76 |
| 4,124,574 | 11/1978 | Preston et al. | 528/76 |
| 4,182,898 | 1/1980 | Fujiwara et al. | 560/26 |
| 4,202,957 | 5/1980 | Bonk et al. | 528/77 |

*Primary Examiner*—Maurice J. Welsh
*Attorney, Agent, or Firm*—James S. Rose; Denis A. Firth

[57] ABSTRACT

Improved thermoplastic polyurethane elastomers are disclosed which are the reaction product of 4,4'-methylene-bis(phenyl isocyanate); a polymeric diol; and an extender wherein the equivalent proportions of said diol to said extender fall within the range of about 1:2 to about 1:20 and the isocyanate to total hydroxyl equivalents are within the range of about 0.99:1 to 1.06:1, the improvement which comprises replacing at least about 15 percent by weight of said polymeric diol by a polyol selected from the class consisting of: (i) polyoxypropylene-polyoxyethylene glycols having a molecular weight of about 3500 to about 4500 and an ethylene oxide content of about 10 to about 60 percent by weight; (ii) polyoxypropylene-polyoxyethylene triols having a molecular weight from about 5000 to about 7000 and an ethylene oxide content of about 10 to about 40 percent by weight; and (iii) mixtures of (i) and (ii).

The elastomers find particular utility in the manufacture of ski boots, hockey boots and automotive exterior panels, bumpers, fascia, and the like.

20 Claims, No Drawings

NOVEL POLYURETHANE PRODUCT

CROSS-REFERENCE TO RELATED APPLICATION

This application is a continuation-in-part of pending application Ser. No. 348,324 filed Feb. 12, 1982 which latter is a continuation of Ser. No. 209,862 filed Nov. 24, 1980 both of which are now abandoned. The disclosure of said Ser. No. 348,324 is hereby incorporated by reference in its entirety.

BACKGROUND OF THE INVENTION

1. Field of the Invention

This invention relates to polyurethane elastomers an is more particularly concerned with improved thermoplastic polyurethane elastomers obtained by replacing part of the conventional polymeric diol by a modifier polyol.

2. Description of the Prior Art

The preparation of thermoplastic polyurethane elastomers is well known in the art. Such elastomers can be extruded, injection molded and fabricated in other known manner to form many different shapes and configurations which find utility in a large number of applications.

Thermoplastic polyurethane elastomers which withstand high processing temperatures (as high as 450° F.) and which are based on particular polyether glycols have been described previously in U.S. Pat. No. 4,202,957. Polyester polyurethanes are also well known materials as typically disclosed in U.S. Pat. Nos. 2,871,218 and 3,015,650.

Various combinations of polyester polyols and polyether polyols have been employed in the preparation of polyurethanes having a diversity of properties. For example, U.S. Pat. No. 3,493,634 discloses thermoplastic polyurethane elastomers prepared from a mixture of a polyester diol, polyoxyalkylene glycol, and a glycol extender. U.S. Pat. Nos. 3,798,200 and 3,963,681 disclose polyether mixtures in the preparation of soft cross-linked polyurethanes. Further, U.S. Pat. No. 4,010,146 discloses blends of polyoxytetramethylene glycol with certain polyoxypropylene-polyoxyethylene block copolymer diols to make soft thermoplastic elastomer suitable for hose manufacture. U.S. Pat. No. 4,049,636 discloses blends of polyoxypropylene-polyoxyethylene glycols with graft or reinforced polyalkylene ether polyols for the preparation of thermoplastic polyurethanes having good thermal resistance along with improved processability and moldability. U.S. Pat. No. 4,124,572 discloses certain blends of polyester polyols with particular polyoxypropylene-polyoxyethylene glycols which are alleged to have higher tensile strengths than prior art polyether and polyester based polyurethanes. U.S. Pat. No. 4,182,898 teaches the use of isocyanate terminated prepolymers prepared from a blend of polyester polyol and polyether polyol to prepare cast urethane elastomers.

Molded polyurethane parts for use in the automotive industry have become of increasing importance. As the demand has risen for such parts, so have the physical property requirements increased. This is particularly true in the area of good low temperature impact strength and good paintability and the combination of these features in one molded article. In this regard, U.S. Pat. No. 3,915,937 discloses flexible painted automobile exterior parts which remain intact under a 5 MPH impact test at −20° F. and which parts are molded from polyurethanes based on particular polyoxypropylene glycols or ethylene oxide tipped polyoxypropylene glycols. Further, U.S. Pat. No. 4,124,574 describes polyurethane elastomers having improved paint adhesion and good impact strength and which are prepared from a particular polyether polyol.

We have discovered new, intermediate to high modulus, thermoplastic polyurethane elastomers obtained by the replacement of part of the conventional polyester and/or polyether diols with a particular polyoxypropylene-polyoxyethylene diol or triol. The polyoxypropylene-polyoxyethylene diols or triols by themselves cannot be used to prepare intermediate to high modulus thermoplastic polyurethanes nor have they been recognized in the prior art as being particularly useful in the art of relatively hard thermoplastic polyurethanes per se.

Surprisingly, the polyurethanes in accordance with the present invention are characterized by substantially improved impact properties (test defined below) over the conventional unblended systems and even over the various prior art blended systems discussed above. This improved impact strength is quite unexpected in view of the hardness of the instant polyurethanes.

Generally speaking, the painting of molded polyurethane parts leads to a decrease in low temperature (−20° to −30° F.) impact strengths. However, the molded thermoplastic polyurethanes of the present invention which have been painted still retain superior low temperature impact strength compared to the prior art materials.

Further, the present thermoplastic polyurethanes enjoy the above unexpected properties without showing any loss or deficiency in the other commonly observed physical property measurements.

SUMMARY OF THE INVENTION

This invention comprises improved thermoplastic polyurethane elastomers which are the product of reaction of 4,4'-methylenebis(phenyl isocyanate), difunctional extender and a polymeric diol selected from the class consisting of (a) polyoxypropylene-polyoxyethylene copolymers having a molecular weight of from about 1000 to about 3000, and having a minimum content of ethylene oxide (E.O.) residues by weight for any given molecular weight (MW) corresponding to $$\% \text{ E.O.} = \left[ \left( \frac{MW - 900}{4} \right) \times 3 \right] \times \left[ \frac{100}{MW} \right], \quad (I)$$

(b) polyester diols having a molecular weight of from about 1000 to about 4000, and mixtures of (a) and (b), the equivalent proportions of polymeric diol to extender being within the range of about 1:2 to about 1:20 and the ratio of equivalents of said isocyanate to total hydroxyl equivalents being within the range of about 0.99:1 to 1.06:1, wherein the improvement comprises replacing at least about 15 percent by weight of said polymeric diol by a polyol selected from the class consisting of:

(i) polyoxypropylene-polyoxyethylene glycols having a molecular weight of about 3500 to about 4500 and an ethylene oxide content of about 10 to about 60 percent by weight;

(ii) polyoxypropylene-polyoxyethylene triols having a molecular weight from about 5000 to about 7000 and an ethylene oxide content about 10 to about 40 percent by weight; and (iii) mixtures of (i) and (ii).

The term "thermoplastic" is used in the generally accepted sense known to those skilled in the polymer art to mean, inter alia, the ability to be injection molded.

The thermoplastic polyurethane elastomers can be further characterized as intermediate to high modulus materials having a flexural modulus in the range of about 9,000 to about 300,000 psi measured at ambient temperature (about 20° C.) in accordance with ASTM Test D 790. Generally speaking, this flexural range will correspond to a Durometer hardness range of from about 90A to about 80D.

The term "4,4'-methylenebis(phenyl isocyanate)" means a methylenebis(phenyl isocyanate) which contains at least about 90 percent by weight of the 4,4'-isomer the remainder being 2,4'-isomer and/or 2,2'-isomer.

The term "polyester diol" means polymeric polyester diols having the molecular range set forth above and preferably from about 1000 to about 3000 molecular weight, and is inclusive of polyalkylene ester diols, polyoxyalkylene ester diols, polyoxyalkanoyl diols, and the like.

The term "mixtures of (a) and (b)" means mixtures in the proportions by weight of about 5% to about 95% and about 95% to about 5% respectively.

The term "difunctional extender" means an extender diol selected from the group consisting of aliphatic straight chain diols having from 2 to 6 carbon atoms, inclusive, and the bis(2-hydroxyethyl)ethers of hydroquinone and resorcinol, and mixtures thereof.

A preferred class of difunctional extenders is the aliphatic straight chain diols having from 2 to 6 carbon atoms, inclusive.

Within the preferred class of extenders are those in which up to 25 percent, on an equivalent basis, of the difunctional extender is replaced by a diol selected from the group consisting of branch chain aliphatic diols from 3 to 6 carbon atoms, diethylene glycol, dipropylene glycol, polyethylene glycols having a molecular weight from 200 to 600, polypropylene glycols having a molecular weight from 200 to 600, and mixtures thereof. Accordingly, the balance of 75 to 100 percent by equivalents is comprised of a difunctional extender defined above.

A preferred mixture within this class is comprised of (i) from 75 to 100 percent on an equivalent basis of an aliphatic straight chain diol having from two to six carbon atoms, inclusive, and (ii) from 25 to 0 percent by equivalent of a polyethylene glycol having a molecular weight from 200 to 600.

Within the preferred mixtures of difunctional extenders defined above, a preferred mixture is that wherein (i) is 75 to 100 equivalent percent of 1,4-butanediol and (ii) is 25 to 0 percent of a polyethylene glycol of about 400 molecular weight.

DETAILED DESCRIPTION OF THE INVENTION

The thermoplastic polyurethane elastomers of the invention can be prepared by processes conventional in the art for the synthesis of polyurethane elastomers. The conventional preparative processes include the one-shot procedure, in which all the reactants are brought together simultaneously, and the prepolymer procedure, in which the isocyanate is reacted with a portion, or the whole, of the polymeric diol in a first step and the isocyanate-terminated prepolymer so produced is subsequently reacted with the remainder of the polyol and or extender. The one-shot method is the preferred procedure for preparing the elastomeric polyurethanes of the invention. In a most preferred embodiment, the polyurethanes are prepared by a continuous one-shot procedure such as that set forth in U.S. Pat. No. 3,642,964.

Primarily, the novelty of the present invention resides in the replacement of part of the conventional polymeric diol by a modifier polyol or mixture of modifier polyols as defined above, which replacement will be discussed in detail below.

It is well known to those skilled in the art that a polyurethane elastomer, generally speaking, is comprised of soft segments, i.e. the polymer units arising from the reaction of the diisocyanate with the polymeric polyol, and hard segments arising from the reaction of the diisocyanate with the difunctional extender. The present polyurethane elastomers have a soft segment comprised of the more conventional polyethers or polyesters or mixtures thereof in combination with the soft segment from the unconventional polyether diols or triols. When the unconventional diol or triol polyethers are employed as modifier polyols in accordance with the present invention they provide polyurethane elastomers having all the good physical and mechanical properties of the prior art polyurethane elastomers, and, additionally, have the improved impact strength over the prior art polyurethanes. The present polyurethanes contain sufficient separation of soft segment phase from hard segment due to the modifier polyols that a second transition temperature is present below that of the main polymer chain glass transition temperature, or, alternatively, the main Tg is shifted towards a lower temperature and/or broadened thereby providing a mechanism of energy absorption at lower temperatures than prior art materials. Surprisingly, the phase separation is not enough to cause deterioration of the polymer's physical properties.

The conventional type polyoxypropylene-polyoxyethylene copolymers defined above are well known in the art and typical embodiments are described in detail in U.S. Pat. No. 4,202,957 whose disclosure in respect of said copolymers is incorporated by reference herein. The copolymers can be block or random and can contain primary hydroxyls, secondary hydroxyls, and any ratio of mixtures thereof. A preferred polyoxypropylene-polyoxyethylene has a molecular weight falling within the range of from about 1500 to about 2500 and has a minimum ethylene oxide residue content defined by the equation (I) set forth above. A preferred species has a molecular weight of about 2000 and an ethylene oxide residue content of about 45 percent by weight.

The conventional type polyester diols can be any of the polyester diols known to those skilled in the art and meeting the above definitions. The polyester diols include the essentially linear polymeric diols which are obtained by esterification of an aliphatic or aromatic dibasic acid or anhydride with a glycol. Preferably the glycol is employed in excess of the stoichiometric proportion with respect to the acid or anhydride in order to ensure that the polyesters are hydroxyl-terminated. Representative dicarboxylic acids (or their anhydrides) employed in the preparation of the polyester diols are adipic, succinic, pimelic, suberic, azelaic, sebacic, terephthalic, phthalic, and the like acids or their anhydrides or mixtures of two or more of said acids or anhydrides. Adipic acid is the preferred acid. Representative glycols employed in the preparation of the polyalkylene ester diols are the straight chain aliphatic glycols containing from 2 to 10 carbon atoms, inclusive, such as ethylene glycol, propane-1,3-diol, butane-1,4-diol, 2-butene-1,4-diol, hexane-1,6-diol, octane-1,8-diol, decane-1,10-diol, and the like, or mixtures of two or more such glycols.

Representative of glycols employed in the preparation of the polyoxyalkylene ester diols are diethylene glycol, dipropylene glycol, and the like.

Representative of the polyoxyalkanoyl diols are the polycaprolactone diols which are prepared by polymerizing the appropriate caprolactone with the appropriate difunctional initiator, such as an aliphatic glycol as exemplified above or an alkanolamine, and the like. Such procedures and products are well known in the art; see for example, U.S. Pat. No. 2,914,556.

Preferred species of polyester diols include polyethylene adipate, polypropylene adipate, and polybutylene adipate.

The amount of modifier polyol which can be used as replacement for part of the conventional diols to give rise to the unexpected polymer properties in accordance with this invention can vary considerably provided at least about 15 percent by weight is present. Modifier polyol properties such as functionality, molecular weight (MW), and ethylene oxide (E.O.) residue content all play a role in determining the appropriate amount of polyol to be used in any given instance. So long as the modifier polyol meets the definitions of functionality, MW, and E.O. content set forth above, one skilled in the art can readily determine specific amounts to be used by trial and error for any particular combination of polymeric diol and modifier polyol.

If a triol modifier is employed it is preferable that it not be used in amount above about 30 percent by weight, and preferably not higher than about 20 percent as the replacement modifier. Additionally, the preferred MW range for triols is about 5500 to about 6500 and a preferred E.O. content is about 15 to about 30 percent by weight.

In the event mixtures of diol and triol modifier are employed then it is preferable that the triol portion not exceed about 10 percent by weight of the replacement of the conventional diol.

Generally speaking, the polyoxypropylene-polyoxyethylene glycols are preferred over the polyoxypropylene-polyoxyethylene triols as modifier polyols.

Optimum improvement in polymer impact strength is sensitive to the E.O. residue level of the modifier. Generally speaking, optimum improvements are observed when those modifier polyols having E.O. residues towards the lower end of the defined ranges are used when the modifier polyol is employed in lower weight percent ranges. Conversely, those modifiers having E.O. residues towards the higher end of the ranges are used when the modifier polyol is present in the higher weight percent ranges. Generally speaking, the level at which the modifier polyol is used should not exceed about 60 weight percent of the total polyol mixture.

Further, as the polyurethane elastomer hardness level or modulus increases, that is to say as the extender level increases over the polymeric diol (triol) level, then it is preferred to employ the modifier polyols at the higher replacement levels.

Particularly preferred groups of the polyoxypropylene-polyoxyethylene glycols are those having from about 10 to about 35 percent by weight E.O. and which are employed at a replacement level of from about 15 to about 30 percent by weight of the polymeric diol; and those having from about 40 to about 60 percent by weight E.O. and which are employed at a level of from about 35 to about 60 percent by weight.

The polyoxypropylene-polyoxyethylene polyol modifiers are readily prepared by those skilled in the art using conventional methods. Alternatively, they are for the most part, readily available as commercial products.

The polyols are readily prepared by reacting water or the appropriate base diol or triol with either propylene oxide or ethylene oxide either sequentially or as mixtures in the necessary proportions until the desired molecular weight is attained. Typical of the base polyols which can be used are ethylene glycol, diethylene glycol, glycerine, trimethylolpropane, etc.

Although it is not essential that the modifier polyols have no secondary hydroxyls, it is preferred that at least some primary hydroxyls be present, and, more preferably, that a major portion of the diol and triol hydroxyls be primary.

The difunctional extender component as defined above can consist of a single extender or a mixture of extenders in the proportions set forth above. Illustrative of the aliphatic straight chain diols are ethylene glycol, 1,3-propylene glycol, 1,4-butanediol, 1,5-pentanediol, and 1,6-hexanediol. Illustrative of the branch chain aliphatic diols are 1,2-propylene glycol, 1,3-butanediol, and 3-methyl-1,5-pentane diol.

Where mixed extenders are employed they can be added to the other reactants as separate components or can be preblended with any of the above polyol components.

The equivalent proportions of said polyol component, inclusive of said conventional polymeric diol and said modifier polyol, to said extender fall within the range of about 1:2 to about 1:20 in order to provide the polyurethanes of the present invention within the required modulus range. Preferably, the range is about 1:4 to about 1:20, most preferably the range is about 1:5 to 1:15.

The 4,4'-methylenebis(phenyl isocyanate) defined above is employed in such proportions that the overall ratio of equivalents of isocyanate to equivalents of active hydrogen containing materials is within the range of 0.99:1 to 1.06:1, and preferably 1:1 to 1.03:1.

As set forth above, the polyurethane elastomers of the invention are preferably made by the one-shot procedure and most preferably by a continuous one-shot procedure. In such procedures the reactants are brought together in any order. Advantageously, the polymeric polyol components and the extender are preblended and fed to the reaction mixture as a single component, the other major component being the diisocyanate. The mixing of the reactants can be accomplished by any of the procedures and apparatus conventional in the art. Preferably the individual components are rendered substantially free from the presence of extraneous moisture using conventional procedures, for example, by azeotropic distillation using benzene, toluene, and the like, or by heating under reduced pressure at a temperature above the boiling point of water at the pressure employed.

The mixing of the reactants can be carried out at ambient temperature (of the order of 25° C.) and the resulting mixture is then heated to a temperature of the order of about 40° C. to about 130° C., preferably to a temperature of about 90° C. to about 120° C. Alternatively, and preferably, one or more of the reactants is preheated to a temperature within the above ranges before the admixing is carried out. Advantageously, in a batch procedure, the heated reaction components are subjected to degassing in order to remove entrained bubbles of air or other gases before reaction takes place. This degassing is accomplished conveniently by reducing the pressure under which the components are maintained until no further evolution of bubbles occurs. The degassed reaction components are then admixed and transferred to suitable molds or extrusion equipment where the reaction mixture can exotherm above the temperature to which the ingredients were initially heated. The formed polymer can be cured at a temperature of the order of about 20° C. to about 115° C. The time required for curing will vary with the temperature of curing and also with the nature of the particular composition. The time required in any given case can be determined by a process of trial and error.

It is frequently desirable, but not essential, to include a catalyst in the reaction mixture employed to prepare the compositions of the invention. Any of the catalysts conventionally employed in the art to catalyze the reaction of an isocyanate with a reactive hydrogen containing compound can be employed for this purpose; see, for example, Saunders et al., Polyurethanes, Chemistry and Technology, Part I, Interscience, New York, 1963, pages 228–232; see also, Britain et al., J. Applied Polymer Science, 4, 207–211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin dioctoate, dibutyltin dilaurate, and the like. Representative tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, and the like. The amount of catalyst employed is generally within the range of about 0.02 to about 2.0 percent by weight based on the total weight of the reactants.

When the compositions of the invention are prepared by the less preferred prepolymer method, the diisocyanate and the polyols are reacted, if desired, in the presence of a catalyst as defined above, in a preliminary stage to form an isocyanate-terminated prepolymer. The proportions of diisocyanate and polyols employed in the preparation of this prepolymer are consistent with the ranges defined above. The diisocyanate and the polyol are preferably rendered substantially free from the presence of extraneous moisture, using the methods described above, before the formation of the prepolymer is carried out. The formation of the prepolymer is advantageously carried out at a temperature within the range of about 70° C. to about 130° C. under an inert atmosphere such as nitrogen gas in accordance with conventional procedures. The prepolymer so formed can then be reacted, at any desired time, with the extender to form the elastomers of the invention.

This reaction is carried out advantageously within the range of reaction temperatures specified above for the one-shot procedure. In general the prepolymer and the extender are mixed and heated within the requisite temperature range while the mixture is degassed as described previously. The degassed mixture is then transferred to a suitable mold, extrusion apparatus, or the like, and cured as described for the one-shot procedure.

If desired, the elastomers of the invention can have incorporated in them, at any appropriate stage of preparation, additives such as pigments, fillers, lubricants, stabilizers, antioxidants, coloring agents, fire retardants, and the like, which are commonly used in conjunction with polyurethane elastomers.

The very surprising feature of the present elastomers, as noted above, is their markedly improved impact strengths as compared with prior art materials, particularly at low temperatures and even when painted and exposed to low temperature testing.

The test method used to measure sample impact strength was a modified version of the test procedure set forth in Fisher Body automotive specification test procedures FBMS-Z-23 under dart flex impact. The test was modified to increase its severity in respect of the impact energy being applied to the sample at its reduced temperature. Following is the test procedure.

A standard injection molded sheet measuring 4.5"×4.5"×1/16" is flexed and opposing edges fitted into slots 75 mm apart in a jig so that the sample is flexed to a height of 45 mm. The flexed sample is placed in a freezer which is set at the test temperature ($-30°$ F., $-50°$ F., etc.) and stored for at least 4 hours. The cold flexed sample is then immediately transferred to a holding jig in the test apparatus which is at ambient temperature (68° F.) where the sample is impacted. Elapsed time for the sample between freezer and impact is less than 5 seconds so that sample temperature is assumed to be that of the freezer environment.

The apparatus drops a steel head measuring 75 mm long×50 mm diameter with a 25 mm radius on the end from a height of 645 mm onto the cold flexed sample. This drop height produces an impact energy of about 156.3 joules which is equivalent to an 8 M.P.H. impact. Prior art test methods employed a drop height of 250 mm which produces an impact energy of 60.8 joules or 5 M.P.H. Sample failure is when the cold test piece shatters or breaks apart. The sample passes the test when no breakage occurs.

Where the impact testing is carried out on painted sheets, the procedure is the same as that set forth above except for the sample size. Painted samples measure 3"×6"×⅛" so that the sample when fitted into the slots is flexed to a height of 50 mm.

Sample integrity for molded polyurethane parts when impacted at low temperatures is extremely important in present day technology, particularly for molded exterior automotive parts and, more particularly, for painted parts.

While not wishing the present invention to be bound by any theoretical considerations but only by the claims appended hereinbelow, it is believed that the ability of the thermoplastic polyurethanes according to the invention to have such improved low temperature impact strength stems from their having adequate phase separation between the soft and hard segments as defined above. Generally speaking, the phase separation can be detected when the polyurethanes in accordance with the present invention are subjected to dynamic mechanical analysis over a temperature range. In particular, a plot of sample vibrational damping over a temperature range will show both a maximum in the region expected for the Tg of the main polymer segment and another maximum at a temperature much lower than the first Tg value. Alternatively, the main Tg is shifted towards a lower temperature and generally is broadened to cover a lower temperature area. Hence, there is provided a mechanism for absorbing mechanical energy at lower temperatures than the regular Tg temperature.

The following examples describe the manner and process of making and using the invention and set forth the best mode contemplated by the inventors of carrying out the invention but are not to be construed as limiting.

EXAMPLE 1

Two elastomer Samples 1 and 2 were prepared using the reactants and proportions (expressed as equivalents) set forth in Table I. Sample 2 is in accordance with the present invention while Sample 1 is not.

Both samples were prepared by mixing and reacting the components in a twin-screw extruder. The appropriate polyol, butanediol, antioxidant, and wax lubricant, along with 0.1 percent w/w of grey pigment (supplied by Reed Plastics Corp., Holden, Mass.) in the case of Sample 1, were combined in one storage tank and degassed at about 90°–100° C. under about 20–30 mm of mercury pressure before reaction in the extruder.

The degassed resin mixture was then fed into the extruder feed zone along with melted MDI component (at about 60° C.) which was fed into the feed zone from a separate storage system. At the same time the catalyst was added to the feed resin stream.

Reaction in the extruder was carried on at about 200° C. and then the material was extruded as ⅛ inch thick webbing which was cast onto a cooled conveyor belt, and through a cold water bath before dicing. The diced pellets were dried about 2 hours at about 110° C. After standing in sealed containers for over 1 day the material was redried and then injection molded to form sheets measuring 3"×6"×⅛".

The test sheets were painted with Durethane 101 white polyurethane enamel (supplied by PPG Ind., Cleveland, Ohio) prior to being tested for low temperature impact.

TABLE I

| Sample | 1 | 2 |
|---|---|---|
| 4,4'-methylenebis(phenyl isocyanate); (equiv.) | 6.38 | 6.63 |
| Polybutylene adipate diol; MW = 2000, (equiv.) | 0.50 | 0.4625 |
| Polyoxypropylene-polyoxyethylene glycol, 45% EO capped; MW = 2000 (equiv.) | 0.50 | 0.4625 |
| Polyoxypropylene-polyoxyethylene glycol, 20% EO capped, MW = 4000; (equiv.) | — | 0.075 |
| 1,4-butanediol (equiv.) | 5.25 | 5.50 |
| Stannous octoate solution[1] (% w/w) | 0.02 | 0.02 |
| Wax lubricant (% w/w) | 0.25 | 0.25 |
| Antioxidant (% w/w) | 0.25 | 0.25 |

TABLE I-continued

| Sample | 1 | 2 |
|---|---|---|
| Grey pigment (% w/w) | 0.1 | — |
| NCO/OH | 1.02 | 1.02 |
| Properties: | | |
| Flex modulus, psi (at 20° C.)[2] | 9,310 | 12,070 |
| Drop dart impact of painted sample:[3] | | |
| 8 MPH at −24° F. | Failed 9 of 10 | — |
| 8 MPH at −30° F. | — | Pass 6 of 6 |

Footnotes to Table I
[1]Solution is 50/50 w/w of stannous octoate dissolved in dioctyl phthalate as a carrier.
[2]Flex modulus in accordance with ASTM D-790.
[3]Drop dart impact test is defined above.

The Sample 2 material was characterized by superior low temperature drop dart impact compared to Sample 1. Sample 2, at lower temperature conditions than Sample 1, had all test samples passing whereas Sample 1 essentially showed failure in this test, notwithstanding the greater stiffness of Sample 2 as evidenced by its higher flex modulus.

EXAMPLE 2

Using the apparatus and procedure described in Example 1 and the reactants and proportions (expressed in equivalents) set forth under Sample 4 of Table II below, there was prepared a polyurethane elastomer not in accordance with the present invention.

Sample 3 (also not in accordance with this invention) and Samples 5 to 7 (in accordance with this invention) were prepared using the following bench-scale procedure and the ingredients (in equivalents) set forth in Table II.

A 2000 ml. resin flask equipped with a stirrer, thermometer and heating means was charged with sufficient amounts of the appropriate polyol, butanediol, antioxidant, and wax lubricant, and, where applicable, the polyoxyethylene diol extender. The mixture was degassed by heating under reduced pressure (about 0.1 mm of Hg) for about 1½ hours at 90°–100° C.

Enough of the hot degassed resin to produce about 600 g. of final product was weighed into an 800 ml. capacity polyethylene beaker followed by the stannous octoate solution. Mixing of the components was accomplished by manually stirring them with a spatula for about 10 seconds.

The melted MDI component (melted at about 60° C.) in a 250 ml. beaker was added quickly to the 800 ml. beaker and the reactants rapidly hand stirred with the spatula until a sudden viscosity increase was felt (generally speaking about 10 to 12 seconds). The reaction mixture was then immediately poured into a Teflon lined pan where it hardened to form a polyurethane slab.

The poured elastomer and tray were allowed to stand at room temperature (circa 20° C.) for 24 hours. Thereafter the elastomer was granulated and dried for 3 hours at 110° C. The dried material was then injection molded to form 4.5 inch×4.5 inch×1/16" sheets for test purposes. The injection molding barrel and mold temperature for the samples was 435° F. and 130° F. respectively.

TABLE II

| Sample | 3 | 4 | 5 | 6 | 7 |
|---|---|---|---|---|---|
| MDI (equiv.) | 9.83 | 9.28 | 11.73 | 11.22 | 10.71 |
| Polycaprolactone diol MW = 1250 (equiv.) | 1.0 | — | 0.91 | — | — |

TABLE II-continued

| Sample | 3 | 4 | 5 | 6 | 7 |
|---|---|---|---|---|---|
| Polybutylene adipate diol; MW = 2000 (equiv.) | — | — | — | 0.30 | — |
| Polyoxypropylene-polyoxyethylene glycol, 45% EO capped, MW = 2000 (equiv.) | — | 1.0 | — | 0.60 | 0.87 |
| Polyoxypropylene-polyoxyethylene glycol, 20% EO capped, MW = 4000 (equiv.) | — | — | 0.09 | 0.10 | 0.13 |
| Polyoxyethylene diol, MW = 400 (equiv.) | 0.50 | 0.60 | 0.50 | — | 0.50 |
| 1,4-butanediol (equiv.) | 8.14 | 7.5 | 10.0 | 10.0 | 9.0 |
| Stannous octoate sol'n. % w/w | 0.02 | 0.02 | 0.02 | 0.02 | 0.02 |
| Wax lubricant, % w/w | 0.25 | 0.25 | 0.25 | 0.25 | 0.25 |
| Antioxidant, % w/w | 0.25 | 0.25 | 0.25 | 0.25 | 0.25 |
| NCO/OH | 1.02 | 1.02 | 1.02 | 1.02 | 1.02 |
| Properties: | | | | | |
| Tensile modulus, psi | | | | | |
| at 50% | — | — | — | 3775 | 2440 |
| 100% | — | — | — | 3900 | 2700 |
| 300% | — | — | — | 4120 | 4175 |
| Tensile str., psi | — | — | — | 5225 | 5075 |
| % elongation | — | — | — | 360 | 370 |
| Tensile set | — | — | — | 75 | 40 |
| Hardness[1] | — | 55D | — | — | 60D |
| Flexural modulus, psi | | | | | |
| 72° F. | 284,450 | 19,000 | 291,720 | 78,940 | 32,270 |
| 20° F. | — | — | — | 206,500 | — |
| −10° F. | — | — | — | 303,400 | — |
| Drop dart impact, 8 MPH, unpainted samples | Fails at 68° F. | Fails 3 of 3 at −50° F. | Passes at 68° F. | Passes at −45° F. | Pass 4 of 5 at −50° F. |

Footnote to Table II
[1]Hardness is the Shore A or D Durometer hardness according to ASTM test method D2240.

Sample 3 failed the dart impact test even at ambient temperature (68° F.) whereas Sample 5 passed the test under the same conditions. Samples 6 and 7 passed the dart impact test even when the samples were at −45° and −50° F. respectively. Samples 6 and 7 were found to have the excellent physical properties set forth in Table II.

Samples 3 and 5 to 7 were subjected to the vibrational damping vs. temperature measurements discussed above. The samples were tested using a DuPont Model 980 dynamic mechanical analyzer retrofitted to obtain quantitative tan δ measurements over the temperature range of −100° C. to +100° C. The 980 MDA module was used in conjunction with the DuPont 990 Thermal Analyzer. The program rate was 5° C./minute with the chart responding to 5 Hz per inch of chart. The scans for the four samples showed the following temperature maximum data.

Sample 3: one maximum, Tg=about 50° C.;
Sample 5: two maxima, Tg=about 59°; and T=−55°;
Sample 6: two maxima, Tg=about 55° C.; and T=−50° C.;
Sample 7: two maxima, Tg=about 0° C.; and T=−50° C.;

A comparison of Samples 4 and 7 illustrates vividly the effectiveness of the modifier polyol in Sample 7 for improving the low temperature impact strength of the polyurethane elastomer. In spite of the much higher flex modulus of Sample 7 over Sample 4, the former sample passed 4 of 5 samples at 8 MPH at −50° F. whereas Sample 4 failed 3 of 3 at −50° F. Likewise, the comparison of Sample 3 and 5 illustrates the effectiveness of the small amount of modifier polyol in allowing the very stiff Sample 5 to pass the 8 MPH test at 68° F. whereas the equally stiff Sample 3, not of the invention, failed the test.

EXAMPLE 3

The following elastomer Samples 8 to 13, inclusive, all in accordance with the present invention, were prepared using the reactants and proportions (expressed as equivalents) set forth in Table III. All of the samples with the exception of Sample 10 were prepared using the bench-scale procedure described in Example 2. Sample 10 was prepared in accordance with the method and apparatus set forth in Example 1.

Samples 9 and 10 were injection molded into the 3″×6″×⅛″ sheets suitable for the painted impact testing described in Example 1 whereas the other samples were injection molded into the 4.5″×4.5″×1/16″ sheets suitable for the unpainted impact testing.

Samples 10 through 13, inclusive, contain a triol modifier polyol with Samples 11 to 13 containing the additional diol modifier. Excellent low temperature impact strength is evidenced by all the samples. Particularly noteworthy is Sample 8 wherein all the samples passed the 8 MPH test at −40° F. in spite of their stiffness (high modulus). Moreover, all of the painted samples passed the 8 MPH tests at −29° and −28° F. Painted impact is recognized as being particularly difficult for polyurethane elastomers to pass at reduced temperatures.

TABLE III

| Sample | 8 | 9 | 10 | 11 | 12 | 13 |
|---|---|---|---|---|---|---|
| MDI (equiv.) | 8.57 | 8.16 | 6.73 | 11.22 | 11.22 | 12.14 |
| Polycaprolactone diol, | 0.94 | — | — | — | — | — |

TABLE III-continued

| Sample | 8 | 9 | 10 | 11 | 12 | 13 |
|---|---|---|---|---|---|---|
| MW = 1250 (equiv.) Polybutylene adipate diol, MW = 2000 (equiv.) | — | 0.65 | 0.45 | — | 0.45 | — |
| Polyoxypropylene-polyoxy-ethylene glycol, 45% EO capped, MW = 2000 (equiv.) | — | — | 0.45 | — | 0.45 | 0.88 |
| Polycaprolactone diol, MW = 2000 (equiv.) | — | — | — | 0.92 | — | — |
| Polyoxypropylene-polyoxy-ethylene glycol, 20% EO capped, MW = 4000 (equiv.) | 0.06 | — | — | 0.06 | 0.075 | 0.09 |
| Polyoxypropylene-polyoxy-ethylene glycol, 45% EO; MW = 3700 (equiv.) | — | 0.35 | — | — | — | — |
| Polyoxypropylene-polyoxy-ethylene triol, 25-28% EO capped, MW = 6000 (equiv.) | — | — | 0.10 | 0.02 | 0.025 | 0.03 |
| 1,4-Butanediol (equiv.) | 7.40 | 7.0 | 5.60 | 10.0 | 10.0 | 10.9 |
| Stannous octoate sol'n. % w/w | 0.02 | 0.02 | 0.02 | 0.02 | 0.02 | 0.02 |
| Wax lubricant, % w/w | 0.25 | 0.25 | 0.25 | 0.25 | 0.25 | 0.25 |
| Antioxidant, % w/w | 0.25 | 0.25 | 0.25 | 0.25 | 0.25 | 0.25 |
| NCO/OH | 1.02 | 1.02 | 1.02 | 1.02 | 1.02 | 1.02 |
| Properties: | | | | | | |
| Hardness | 80D | 48D | — | 72D | 70D | — |
| Flexural modulus, psi room temp. (about 20° C.) | 270,600 | 14,450 | 12,040 | 54,440* | 77,700 | 111,400 |
| Drop dart impact, 8 MPH | unpainted samples pass 4 of 4 at −40° F. | painted samples pass 8 of 8 at −29° F. | painted samples pass 10 of 10 at −28° F. | unpainted samples pass 3 of 3 at −45° F. | unpainted samples pass 5 of 5 at −45° F. | unpainted samples pass 5 of 5 at −45° F. |

*Temp. at which modulus was determined was 25° C.

EXAMPLE 4

The following elastomer samples were prepared using the reactants and proportions (expressed as equivalents) set forth in Table IV. All of the samples were prepared using the bench-scale procedure described in Example 2 and all were injection molded into the 4.5"×4.5"×1/16" sheets suitable for unpainted impact testing.

Samples 14, 15, and 17 are not in accordance with the present invention whereas Samples 16 and 18 are so in accordance.

The two minor polyol constituents used in conjunction with the 2000 MW caprolactone diol were polyoxypropylene-polyoxyethylene glycols which were custom prepared (by Witco Chemical Corp., Chicago, Ill.) specifically for the comparison experiments performed herein. These comparison experiments were carried out originally to satisfy the requirements of a showing which was to be filed in a prior application Ser. No. 209,862 filed Nov. 24, 1980 now abandoned. It was desired to compare the properties of the elastomers containing the two polyoxypropylene-polyoxyethylene glycols respectively. One of the glycols would be of the prior art with a 3000 MW and its minimum E.O. requirement (in accordance with Bonk et al U.S. Pat. No. 4,202,957) at about 52 percent while the other glycol would be at the lower MW limit of 3500 in accordance with the present invention and having an E.O. content close to the prior art but at such a level to permit employment at the lower end of its use range.

Samples 15, 16, and 18 containing a minor amount of a glycol in accordance with the present invention displayed increasing opacity which indicates polymer incompatibility. Sample 15 did not contain enough of the glycol to improve the low temperature impact over Sample 14. Both Sample 14 and 15 passed 2 out of 3 tests for the 8 M.P.H. impact at −10° F. and both failed all 3 tests conducted at −30° F. and therefore they were indistinguishable one from the other based on impact test.

The −10° F. impact test data showed Samples 16 and 18 passing 3 of 3 and Sample 17 passing 2 of 3. At these test conditions Samples 16 and 18 in accordance with the invention could hardly be distinguished from Sample 17 not so in accordance.

However, when the impact test temperature was lowered to −30° F., at the 20 percent glycol level Sample 17 failed all 4 tests while Sample 18 which contained 20 percent of glycol in accordance with the invention passed 3 of 4.

At the 15 percent glycol level Sample 16 passed 2 of the 4 which distinguishes it from the prior art glycol Sample 17 which could not pass any tests even at the 20% level.

TABLE IV

| Sample | 14 | 15 | 16 | 17 | 18 |
|---|---|---|---|---|---|
| MDI (equiv.) | 11.39 | 11.37 | 9.94 | 9.99 | 9.99 |
| Polycaprolactone diol MW = 2000 (equiv.) | 1.151 | 1.151 | 0.91 | 0.8591 | 0.08776 |
| Polyoxypropylene-poly-oxyethylene glycol, MW = 3049, 53.5% EO[1] | 0.096 | — | — | 0.1409 | — |
| Polyoxypropylene-poly-oxyethylene glycol, | — | 0.082 | 0.09 | — | 0.1224 |

TABLE IV-continued

| Sample | 14 | 15 | 16 | 17 | 18 |
|---|---|---|---|---|---|
| MW = 3583, 27% EO[2] | | | | | |
| 1,4-Butanediol (equiv.) | 10 | 10 | 8.7 | 8.75 | 8.75 |
| Stannous octoate sol'n. % w/w | 0.02 | 0.02 | 0.02 | — | — |
| Wax lubricant, % w/w | 0.25 | 0.25 | 0.25 | — | — |
| Antioxidant, % w/w | 0.25 | 0.25 | 0.25 | — | — |
| NCO/OH | 1.01 | 1.01 | 1.02 | — | — |
| % by wt. of minor glycol in total polycaprolactone and glycol | 11% | 11% | 15% | 20% | 20% |
| Sample appearance | clear | slightly hazy | opaque | clear | opaque |
| Drop dart impact (unpainted) 8 MPH | | | | | |
| at −10° F. | Pass 2 of 3 | Pass 2 of 3 | Pass 3 of 3 | Pass 2 of 3 | Pass 3 of 3 |
| at −30° F. | Fail all 3 | Fail all 3 | Pass 2 of 4 | Fail all 4 | Pass 3 of 4 |

Footnotes to Table IV
[1]Polyoxypropylene-polyoxyethylene glycol: solid at 25° C., OH # = 36.8, moisture % by wt. = 0.04, potassium, ppm = 0, pH (10% in 10:6 by wt. isopropyl alcohol:water) = 6.8; MW calc. = 3049.
[2]Polyoxypropylene-polyoxyethylene glycol: cloudy liquid at 25° C., OH # = 31.3, MW calc. = 3583, moisture % by wt. = 0.03, potassium, ppm = 0, PH (10% by wt. in 10:6 by wt. isopropyl alcohol:water) = 6.8.

We claim:

1. In a thermoplastic polyurethane elastomer which is the product of reaction of 4,4′-methylenebis(phenyl isocyanate), difunctional extender and a polymeric diol selected from the class consisting of (a) polyoxypropylene-polyoxyethylene copolymers having a molecular weight of from about 1000 to about 3000, and having a minimum content of ethylene oxide (E.O.) residues by weight for any given molecular weight (MW) corresponding to:

$$\% \text{ E.O.} = \left[\left(\frac{MW - 900}{4}\right) \times 3\right] \times \left[\frac{100}{MW}\right],$$

(b) polyester diols having a molecular weight of from about 1000 to about 4000, and mixtures of (a) and (b), the equivalent proportions of polymeric diol to extender being within the range of about 1:2 to about 1:20 and the ratio of equivalents of said isocyanate to total hydroxyl equivalents being within the range of about 0.99:1 to 1.06:1, the improvement which comprises replacing at least about 15 percent by weight of said polymeric diol by a replacement polyol selected from the class consisting of:
   (i) polyoxypropylene-polyoxyethylene glycols having a molecular weight of about 3500 to about 4500 and an ethylene oxide content of about 10 to about 60 percent by weight;
   (ii) polyoxypropylene-polyoxyethylene triols having a molecular weight from about 5000 to about 7000 and an ethylene oxide content of about 10 to about 40 percent by weight; and
   (iii) mixtures of (i) and (ii).

2. A thermoplastic polyurethane according to claim 1 wherein said polymeric diol is a polyoxypropylene-polyoxyethylene copolymer (a) defined in claim 1.

3. A thermoplastic polyurethane according to claim 2 wherein said diol is a 2000 molecular weight polyoxypropylene-polyoxyethylene glycol having about 45 percent by weight of ethylene oxide residues.

4. A thermoplastic polyurethane according to claim 1 wherein said polymeric diol is a polyester diol (b) defined in claim 1.

5. A thermoplastic polyurethane according to claim 4 wherein said polyester diol is a polyalkylene ester diol.

6. A thermoplastic polyurethane according to claim 5 wherein the polyester diol is a 2000 molecular weight polybutylene adipate.

7. A thermoplastic polyurethane according to claim 1 wherein said polymeric diol is a mixture of said polyoxypropylene-polyoxyethylene copolymer (a) and said polyester diol (b) defined respectively in claim 1.

8. A thermoplastic polyurethane according to claim 1 wherein said replacement polyol is a polyoxypropylene-polyoxyethylene glycol having a molecular weight of about 3500 to about 4500 and an ethylene oxide content of about 10 to about 60 percent by weight.

9. A thermoplastic polyurethane according to claim 1 wherein said replacement polyol is a polyoxypropylene-polyoxyethylene triol having a molecular weight about 5000 to about 7000 and an E.O. content of about 10 to about 40 percent by weight.

10. A thermoplastic polyurethane according to claim 1 wherein said replacement polyol comprises mixtures of a polyoxypropylene-polyoxyethylene glycol having a molecular weight about 3500 to about 4500 and an E.O. content of about 10 to about 60 percent by weight and a polyoxypropylene-polyoxyethylene triol having a molecular weight about 5000 to about 7000 and an E.O. content of about 10 to about 40 percent by weight.

11. In a thermoplastic polyurethane elastomer which is the product of reaction of 4,4′-methylenebis(phenyl isocyanate), difunctional extender and a polymeric diol selected from the class consisting of (a) a 2000 MW polyoxypropylene-polyoxyethylene glycol having about 45 percent by weight of E.O. residues, (b) a 2000 MW polybutylene adipate, and mixtures of (a) and (b), the equivalent proportions of polymeric diol to extender being within the range of about 1:2 to about 1:20 and the ratio of equivalents of said isocyanate to total hydroxyl equivalents being within the range of about 0.99:1 to 1.06:1, the improvement which comprises replacing at least about 15 percent by weight of said polymeric diol by a polyoxypropylene-polyoxyethylene glycol having a molecular weight of about 3500 to about 4500 and an E.O. content of about 10 to about 60 percent by weight.

12. A thermoplastic polyurethane according to claim 11 wherein said difunctional extender comprises (i) from about 75 to 100 percent on an equivalent basis of an aliphatic straight chain extender diol having from 2 to 6 carbon atoms, inclusive, and (ii) from 25 to 0 percent by equivalents of a polyethylene glycol having a molecular weight from about 200 to about 600.

13. A thermoplastic polyurethane according to claim 11 wherein said polymeric diol is a 2000 MW polyoxypropylene-polyoxyethylene glycol having about 45 percent by weight of E.O. residues.

14. A thermoplastic polyurethane according to claim 11 wherein said polymeric diol is a 2000 MW polybutylene adipate.

15. A thermoplastic polyurethane according to claim 11 wherein said polymeric diol is a mixture of a 2000 MW polyoxypropylene-polyoxyethylene glycol having about 45 percent by weight of E.O. residues and a 2000 MW polybutylene adipate.

16. A thermoplastic polyurethane according to claim 11 wherein said replacement glycol is a polyoxypropylene-polyoxyethylene glycol of MW about 4000 and E.O. content of about 20 percent by weight.

17. A thermoplastic polyurethane according to claim 11 wherein said replacement glycol is a polyoxypropylene-polyoxyethylene glycol of MW about 3700 and E.O. content of about 45 percent by weight.

18. A thermoplastic polyurethane according to claim 11 wherein said polymeric diol comprises a mixture of about 50 percent by weight of a 2000 MW polybutylene adipate and the balance a polyoxypropylene-polyoxyethylene glycol MW about 3700 and E.O. content of about 45 percent by weight.

19. A thermoplastic polyurethane according to claim 11 wherein said polymeric diol comprises a mixture of about 82 percent by weight of a 33/67 weight percent mixture of a 2000 MW polybutylene adipate and a 2000 MW polyoxypropylene-polyoxyethylene diol having about 45 percent by weight E.O. and the balance a polyoxypropylene-polyoxyethylene glycol MW about 4000 and E.O. content of about 20 percent by weight.

20. A thermoplastic polyurethane according to claim 18 or 19 wherein said extender is 1,4-butanediol.

* * * * *